(12) United States Patent
Anderson

(10) Patent No.: US 7,844,310 B2
(45) Date of Patent: Nov. 30, 2010

(54) WEARABLE COMMUNICATION DEVICE WITH CONTOURED BACK

(75) Inventor: Robert C. Anderson, Cumming, GA (US)

(73) Assignee: L3 Communications Corporation, New York, NY (US)

( * ) Notice: Subject to any disclaimer, the term of this patent is extended or adjusted under 35 U.S.C. 154(b) by 668 days.

(21) Appl. No.: 11/608,875

(22) Filed: Dec. 11, 2006

(65) Prior Publication Data
US 2008/0032638 A1 Feb. 7, 2008

Related U.S. Application Data

(63) Continuation-in-part of application No. 29/247,928, filed on Jul. 20, 2006, now Pat. No. Des. 572,266.

(60) Provisional application No. 60/807,871, filed on Jul. 20, 2006, provisional application No. 60/807,884, filed on Jul. 20, 2006.

(51) Int. Cl.
*H04M 1/00* (2006.01)

(52) U.S. Cl. .................. 455/575.1; 455/90.3; 455/128; 455/347; 379/330; 379/428.01

(58) Field of Classification Search ............. 455/575.1, 455/90.3, 128, 347, 3.06; 379/330, 428.01, 379/431, 447
See application file for complete search history.

(56) References Cited

U.S. PATENT DOCUMENTS

| D323,939 S | 2/1992 | Mok |
| D347,733 S | 6/1994 | Miller |
| 5,636,775 A | 6/1997 | Kartsotis et al. |
| 5,657,201 A * | 8/1997 | Kochis .................. 361/679.41 |
| D404,908 S | 2/1999 | Lollis |
| D420,506 S | 2/2000 | Merritt |
| 6,801,476 B2 * | 10/2004 | Gilmour ...................... 368/13 |
| 6,912,287 B1 * | 6/2005 | Fukumoto et al. ........... 381/151 |
| 7,137,069 B2 * | 11/2006 | Abbott et al. ............... 715/744 |
| 7,283,841 B2 * | 10/2007 | Luke et al. ............... 455/556.1 |

(Continued)

OTHER PUBLICATIONS

W-B Pen and Watch; www.pendsandwatches.com, printed Aug. 14, 2006, 12 pages.
www.amazon.com; printed Jan. 19, 2006, PSP Soft Case and Wrist Strap; 6 pages.

*Primary Examiner*—Minh D Dao
(74) *Attorney, Agent, or Firm*—Gardner Groff Greenwald & Villanueva, PC

(57) ABSTRACT

An improved PDA-like portable electronic communication device includes a housing having a display screen on the front and a mounting surface that is contoured to generally conform to the shape of a user's forearm. In this way, the communication device can be comfortably and securely worn on a user's forearm so that it is constantly or immediately available for use. In example embodiments, the mounting surface is formed by the back side of the housing and is cylindrically concave or frustoconically concave. In other example embodiments, the device includes a mount to which the housing attaches in multiple positions, with the mount having a frustoconically concave back surface in one embodiment and with another embodiment additionally including mating cylindrically convex and concave surfaces of the mount and the housing.

5 Claims, 9 Drawing Sheets

U.S. PATENT DOCUMENTS

| | | | |
|---|---|---|---|
| 2001/0040591 A1* | 11/2001 | Abbott et al. | 345/700 |
| 2003/0194084 A1* | 10/2003 | Gilmour | 379/433.1 |
| 2004/0203414 A1* | 10/2004 | Satou et al. | 455/66.1 |
| 2005/0007885 A1* | 1/2005 | Gilmour | 368/13 |
| 2005/0207599 A1* | 9/2005 | Fukumoto et al. | 381/151 |
| 2005/0240251 A1 | 10/2005 | Smith | |
| 2005/0276164 A1* | 12/2005 | Amron | 368/82 |
| 2006/0255963 A1* | 11/2006 | Thompson et al. | 340/825.69 |
| 2008/0024961 A1* | 1/2008 | Anderson et al. | 361/679 |

\* cited by examiner

WEARABLE COMMUNICATION DEVICE WITH CONTOURED BACK

CROSS-REFERENCE TO RELATED APPLICATIONS

The present application is a continuation-in-part of U.S. Design patent application Ser. No. 29/247,928, filed Jul. 20, 2006 now U.S. Pat. No. D,572,266, and claims the priority benefit of U.S. Provisional Patent Application Ser. No. 60/807,871 and U.S. Provisional Patent Application Ser. No. 60/807,884, both filed Jul. 20, 2006, the entire content and scope of which are hereby incorporated herein by reference.

FIELD OF THE INVENTION

The present invention relates generally to the field of portable communication devices, such as PDA-like devices. In particular, the present invention relates to a PDA-like device adapted to be worn on the wrist.

BACKGROUND OF THE INVENTION

Portable computers and communication devices have developed to the point that it is common to have a portable, small (often a few inches across by several inches long) device that can serve as a computer for accomplishing various tasks. One example of such a portable electronic device is the so-called Personal Digital Assistant (PDA). These devices often are wirelessly connected to a wireless network of some sort to allow the devices to send and receive messages and/or data. There are various types of PDA's, including the ubiquitous BLACKBERRY devices available from RESEARCH IN MOTION LIMITED, as well devices specially adapted for use by the United States military forces.

Conventional PDA's typically come with a carrying case that clips onto the user's belt or pocket. Many such cases are configured so that the display screen and keypad of the PDA face inward towards the user's body for protection. Because the screen and keypad are facing inward and are at the user's waist, the PDA cannot be used unless it is removed from its case. When a person wants to use the device, for example to send or receive an email, they must reach down and slip the PDA out of its case. After use, the PDA is then returned to its waist-mounted carrying case.

For users in some situations, it would be advantageous to have quicker and easier access to their portable communication device, without having to remove the device from a waist-mounted carrying case or a pocket. For example, soldiers engaged in warfare would be better-served by having constant or immediate access to their portable communication devices to send and receive maps, receive orders, request reinforcement, report enemy positions and strength, etc. In the fog of battle, having better information and getting it faster can improve military effectiveness and save lives. In addition, frequently handling a communication device, when removing it for use and storing it afterwards, increases the likelihood of dropping, losing, or damaging the device. Furthermore, businesspersons and others using conventional PDA's would also benefit from more ready access to their devices, for example, when walking through an airport carrying luggage, a laptop computer, etc.

Accordingly, it can be seen that a need exists for a PDA or other portable communication device that can be carried in a way so that it is constantly or immediately available for use. It is to the provision of a solution meeting this and other needs that the present invention is primarily directed.

SUMMARY OF THE INVENTION

Generally described, the present invention comprises an improved portable electronic communication device that is adapted for wearing on the forearm of a user. The communication device is a PDA-like device configured for receiving communications and data, or a similar communications device such as those used in military units or by package delivery services. The communication device includes a housing, a display screen, a battery, and a mounting surface. In addition, the communication device may be provided with at least one strap or band attached to the housing for securing the device to the user's forearm, or it may be provided without the strap or band for use with a carrier that can be worn on the forearm. The housing has a front, a back, and sides. The display screen is at the front of the housing. The battery is preferably, but not necessarily, mounted at one of the sides so that it can be removed and replaced without removing the communication device from the user's forearm. And the mounting surface is contoured to generally conform to the user's forearm. In this way, the communication device can be comfortably and securely worn on the user's forearm so that the display screen is constantly or immediately accessible and viewable by the user.

In a first example embodiment of the present invention, the contoured mounting surface is on the housing back and has a cylindrically concave shape. This cylindrically concave shape generally conforms to the convex curvature of the typical human forearm. The housing is typically at least about 3 or 4 inches or more long and at least about 2 or 3 inches or more across, which is a good bit larger than other known wrist-mounted devices (e.g., wristwatches). In addition, some users (e.g., military personnel, package delivery persons) will wear their communication devices for very extended periods of time. With the communication device being relatively large and worn for relatively long periods of time, a poor fit on the forearm can become very uncomfortable. The contoured shape significantly adds to the comfort, stability, and low profile of the device when worn on the forearm.

A second example embodiment also has the contoured mounting surface on the housing back, but the mounting surface has a frustoconically concave shape. The tapering and decreasing radius of the housing-back mounting surface more closely matches the tapered and decreased radius aspect of the human forearm, so this embodiment provides even more comfort and stability on the arm. Because the mounting surface is tapered along its length, the housing back has two flat portions with the contoured mounting surface between them.

In a third example embodiment, the communication device includes a mount that is coupled to the housing, and the contoured mounting surface is on the back of the mount. Preferably, the mount-back contoured mounting surface has a frustoconically concave shape for providing good comfort and stability on the arm. This frustoconically concave shape orients the communication device on the user's arm, and the display screen must be properly oriented for viewing by the user. In order to allow the housing to be repositioned on the mount for wearing on either the left or the right arm, two or another number of couplings are provided for removably attaching the housing to the mount in the left or right arm position. The couplings may be conventional fasteners such as screws and holes with mating threads. In this way, one model of the communication device can be provided with the capability to be adjusted for wearing on the left or the right forearm.

A fourth example embodiment also includes the multi-positionable housing and mount arrangement, but additionally the mount front and the housing back have conforming cylindrically convex and cylindrically concave shapes. The cylindrically convex mount front and the cylindrically concave housing back are in continuous contact along their length when the housing is positioned for wearing on either the left or the right forearm. In this way, the housing is mounted very stably and securely on the mount in either the left or right forearm position.

Other advantages and benefits of the present invention will become apparent upon reading and understanding the present specification when taken in conjunction with the appended drawings.

DETAILED DESCRIPTION

Figure 1:
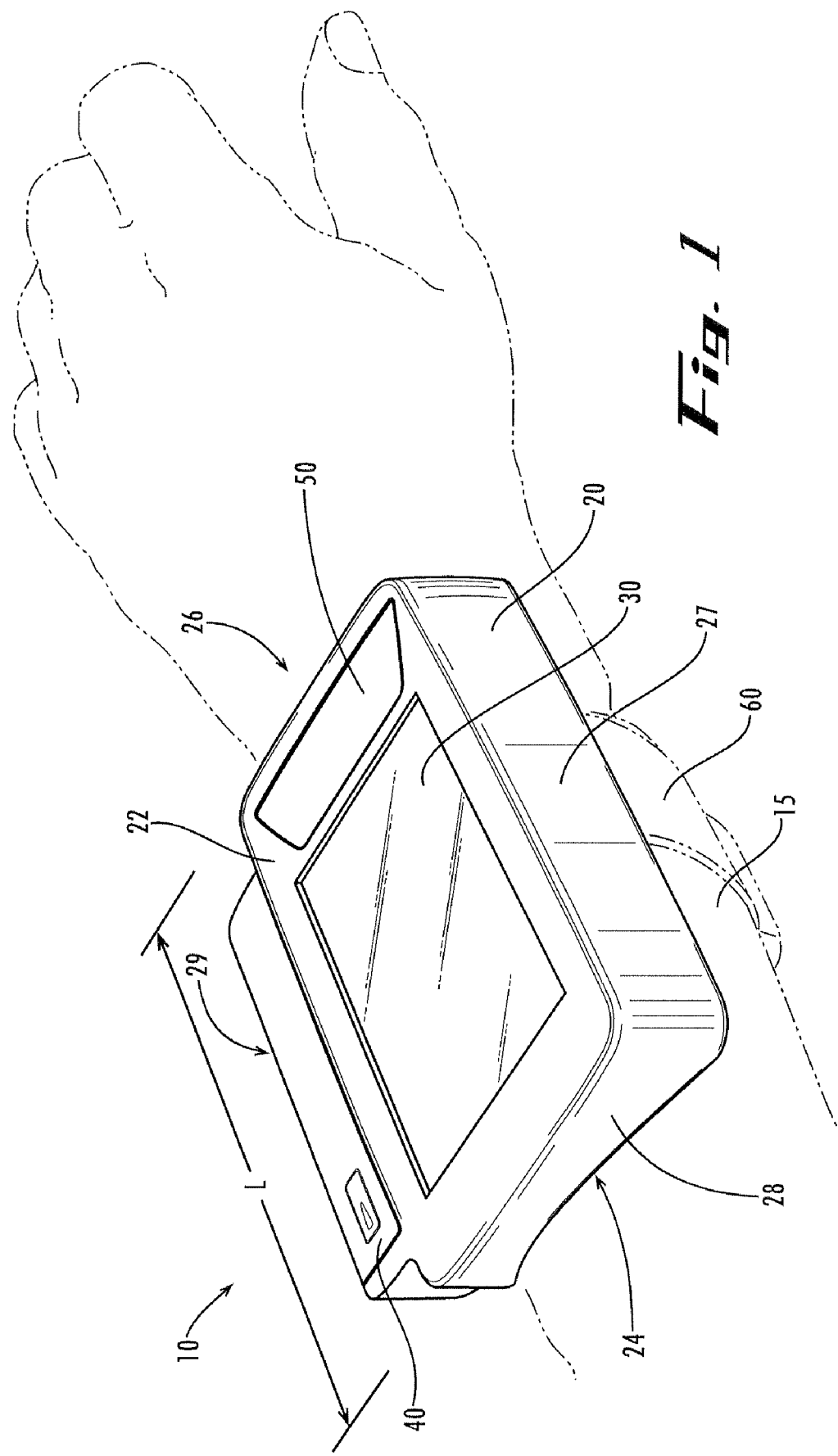
FIG. 1 is a perspective view of a wearable electronic communication device according to a first example embodiment of the present invention, showing the device being worn on a user's forearm adjacent the wrist.

Referring now to the drawings, in which like numerals represent like elements throughout the several views, FIGS. 1-9 depict a wearable electronic communication device 10 according to a first example embodiment of the present invention. The device 10 comprises a housing 20, a display screen 30, and a battery 40. The wearable communication device 10 of the present invention can be any number of electronic communication devices including, but not limited to, PDA-like devices configured to receive and transmit communications and/or data to and/or from the wearer or an external source. Such a device has many functions and uses in a wide range of applications, such as in military units, in the package delivery service industry, and in other applications in which a user wishes to access computer data in situations wherein the use of a traditional computer is impossible or impractical.

Generally, the housing 20 of the present invention comprises a front surface 22, a back surface 24, side surfaces 26 and 28, along with top and bottom surfaces 27 and 29, respectively. By and large, the housing 20 is formed in a generally rectangular shape, but can be formed in any number of shapes including, but not limited to, circular, elliptical, polygonal, etc. The housing 20 can be made from a variety of materials; however, in preferred forms, the housing can be made of lightweight materials such as polymers, rubbers, and lightweight metals. In typical embodiments, the housing 20 is about 3 to 7 inches long (most typically about 4½ to 5½ inches long), about 2 to 5 inches across (most typically about 3 to 4 inches across), and about ¾ to ⅞ inch thick, though other dimensions can be suitably used.

The back surface 24 is contoured to generally conform to the contour of a wearer's arm 15 so that the communication device 10 can be comfortably and securely worn on the arm of a wearer. In the example embodiment depicted in FIGS. 1-3, the back surface 24 has a generally cylindrical concave surface such that the radius of curvature remains constant over the length L of the housing 20. In a typical commercial embodiment, the back surface 24 is recessed by about ⅛ inch at the furthest recessed point of the concave back surface 24, though another recess dimension can be suitably used. Also, in the depicted embodiment the entire back surface 24 (except for the flange where the edge-mounted battery connects) of the housing 20 is contoured, but in alternative embodiments the back surface has one or two generally flat or otherwise non-contoured portions adjacent the top and/or bottom surfaces of the housing.

With this cylindrically concave back surface 24, the housing 20 generally conforms to the convex shape of a typical wearer's left or right forearm. Because the housing 20 is so much longer than other known wrist-mounted devices (e.g., wristwatches), the cylindrically concave back surface 24 is a discriminating feature. In particular, it allows the communication device 10 to be comfortably and securely worn on the arm of a wearer so that it is constantly or immediately available for use by the wearer.

The display screen 30 is positioned at the front surface 22 of the housing 20 as depicted in FIG. 1. The screen 30 can provide data and output to the wearer and/or allow a wearer to provide input to the communication device 10. Additionally, at least one input button or pad 50 can be provided on the front surface 22 of the housing 20 to allow wearer interaction with the communication device 10. In alternate forms of the present invention, multiple buttons or pads 50 may be provided for interaction with the communication device 10 for the convenience of the wearer.

Figures 2, 3:
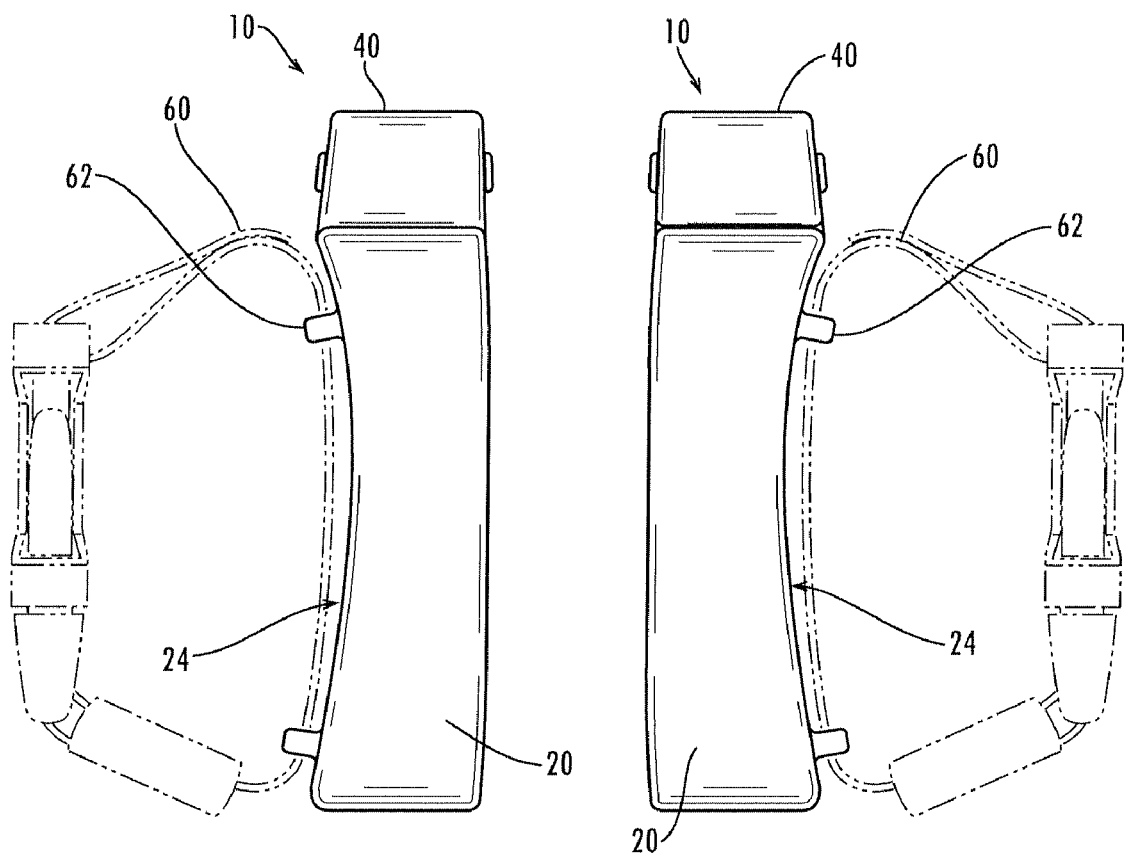
FIG. 2 is a left side view of the wearable communication device of FIG. 1, showing the contoured back of the device.
FIG. 3 is a right side view of the wearable communication device of FIG. 1, showing the contoured back of the device.
Figure 4:
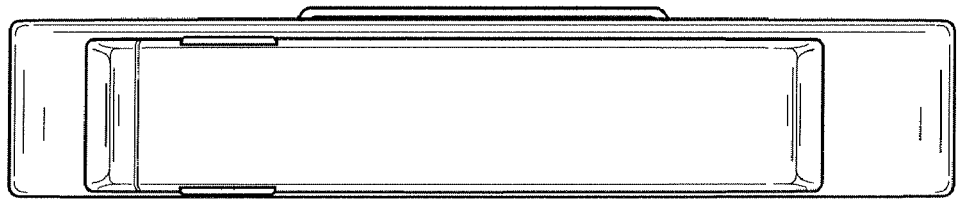
FIG. 4 is a top view of the wearable communication device of FIG. 1.
Figure 5:
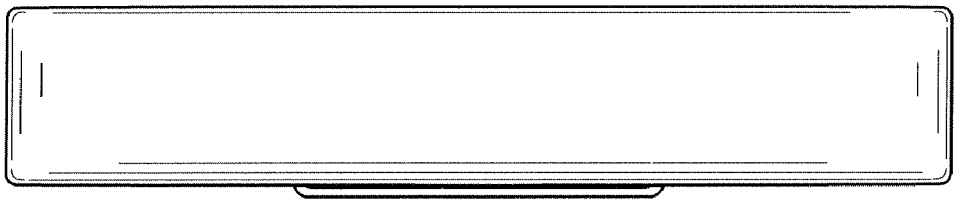
FIG. 5 is a bottom view of the wearable communication device of FIG. 1.

The communication device 10 can utilize a strap or band 60 to hold the device in place on a wearer's arm, as best seen in FIGS. 1-3. In a preferred form, the strap 60 can be looped through two connectors 62 extending from the back surface 24 of the housing 20. In alternative forms, the strap 60 can be integrated within the housing 20 of the communication device 10. In still other forms, the communication device 10 can fit within a pouch strapped to the wearer's arm. A single strap can be used or multiple straps. In the case of a single strap, it is preferred that the strap be fairly wide. Indeed, the strap could even be as wide as the device is long (or more).

Figure 6:
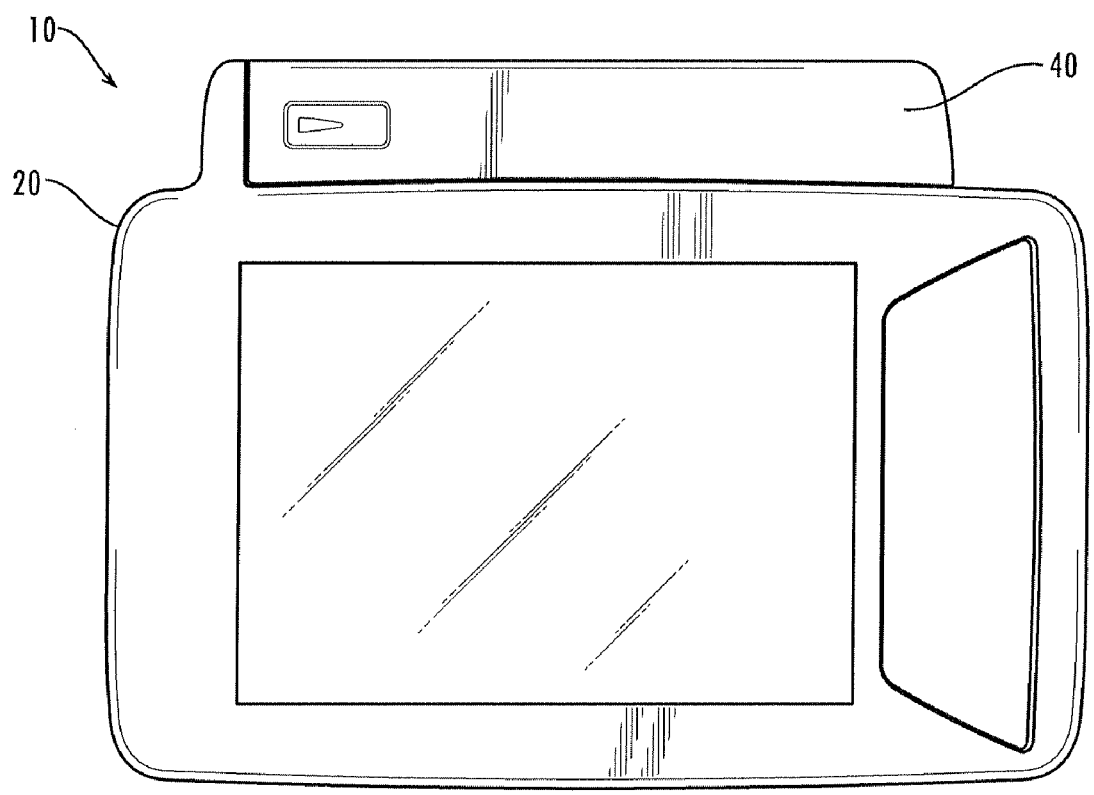
FIG. 6 is a front view of the wearable communication device of FIG. 1.
Figure 7:
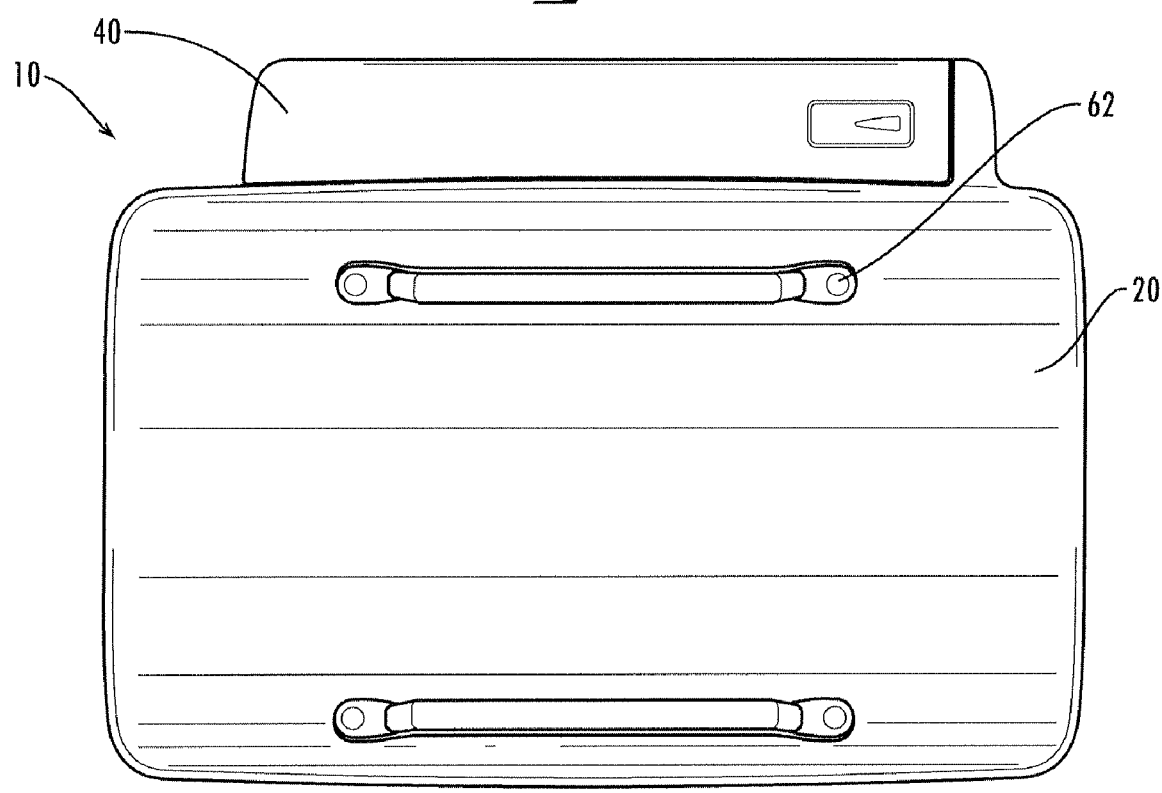
FIG. 7 is a back view of the wearable communication device of FIG. 1.
Figure 8:
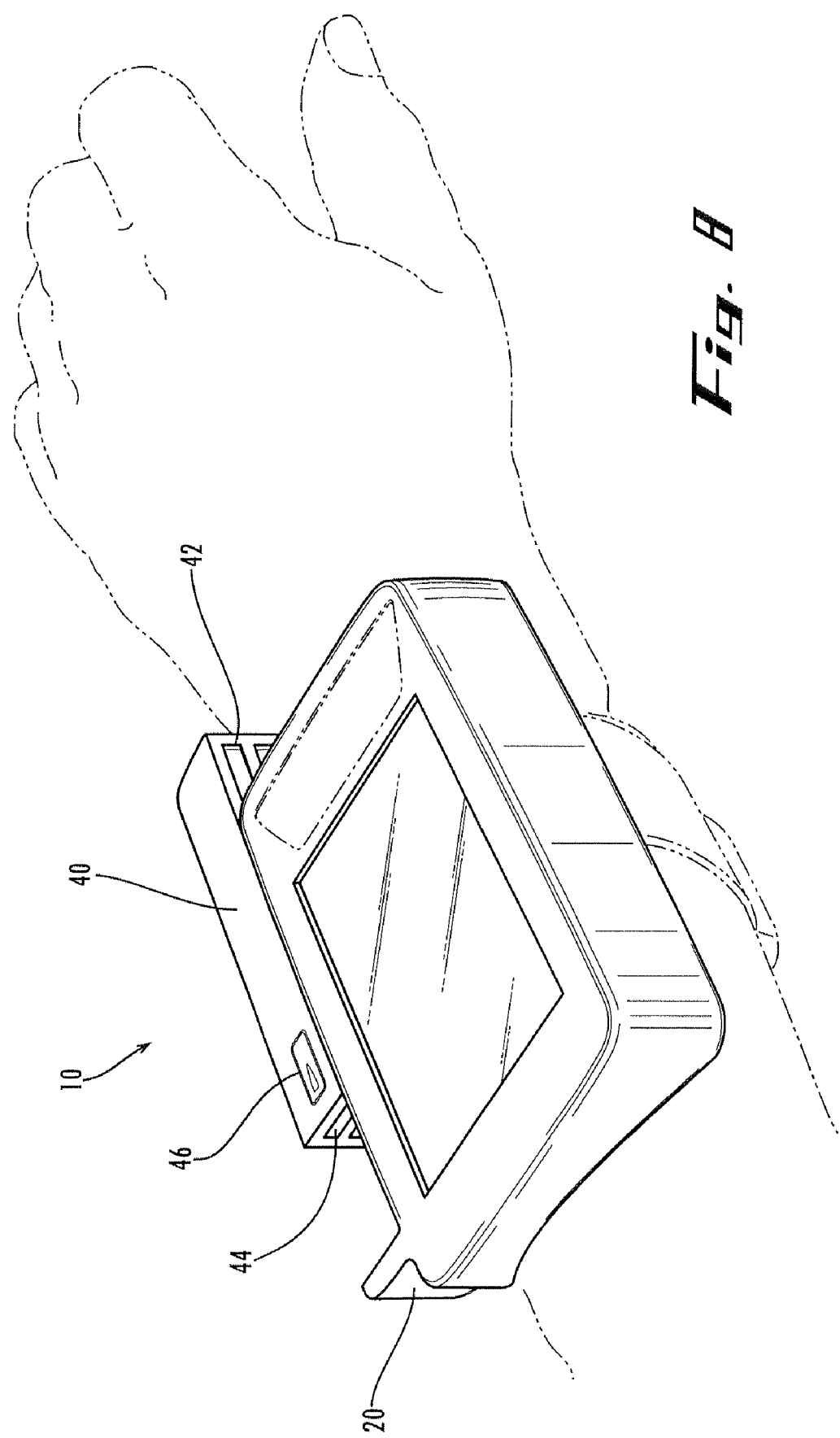
FIG. 8 is a perspective view of the wearable communication device of FIG. 1 shown with battery partially disengaged.
Figure 9:
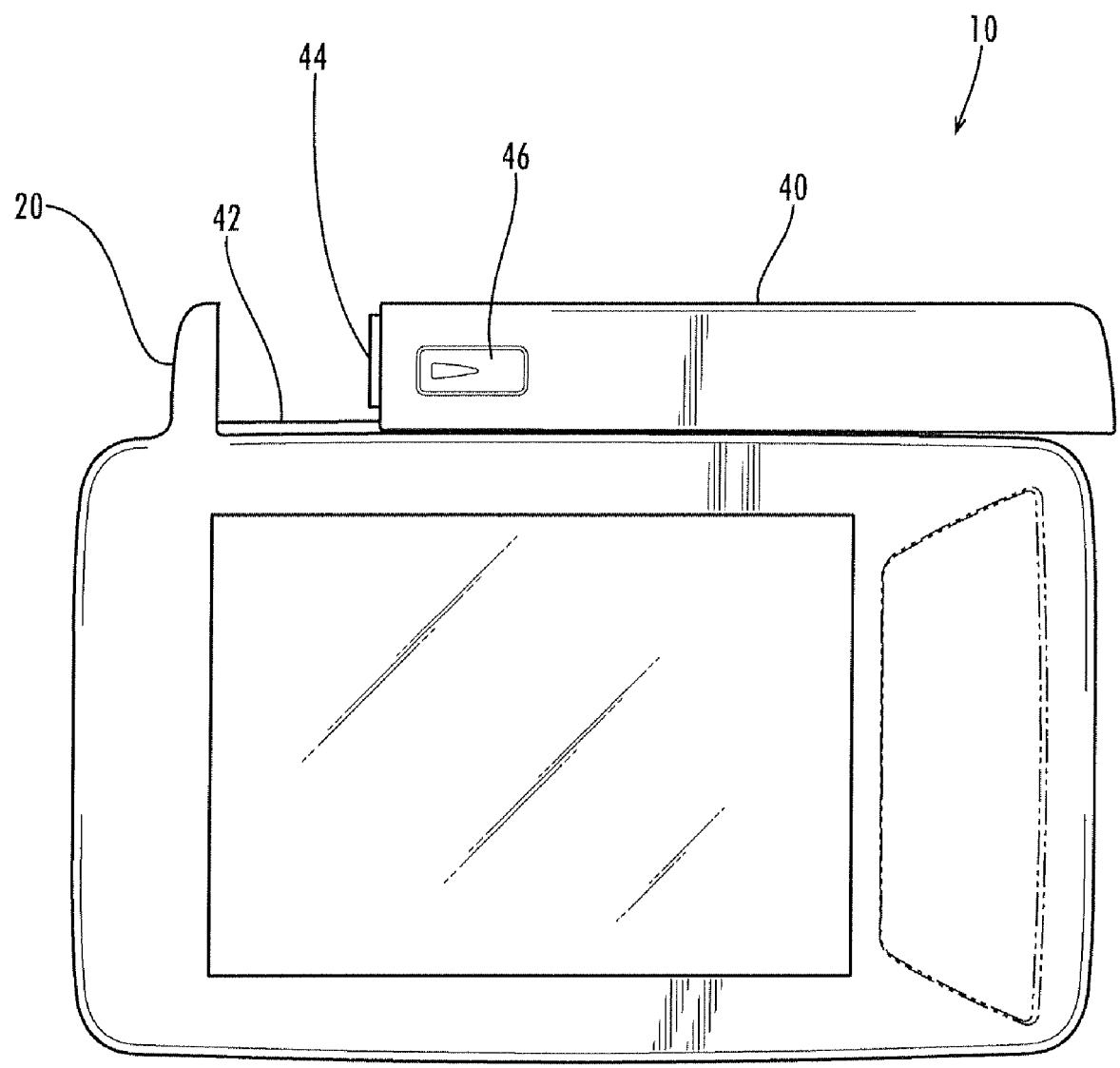
FIG. 9 is a front view of the wearable communication device of FIG. 1 shown with battery partially disengaged.

The battery 40 of the communication device 10 is preferably positioned along one of the sides 26-29 of the housing 20, as best seen in FIGS. 1 and 6-7. In such a configuration, the battery can be removed and replaced without removing the wearable communication device 10 from the wearer's arm. This configuration is an improvement over prior PDA-like electronic devices, which typically feature a display screen on the front of the device and a battery compartment on the back. In one form of the present invention, the battery 40 can slide into releasable engagement with the housing 20 of the communication device 10, as seen in FIGS. 8-9. The battery 40 connects to the housing 20 by sliding on rails 42 positioned along the length of the housing, similar to a sliding dovetail joint, and can be fastened to the housing with a clip or snap (not shown). When the battery 40 is fully engaged with the housing 20, the terminals 44 of the battery are adjacent corresponding terminals within the housing for communicating electrical power. The battery 40 can provide the main power to operate the electronic device 10, or the battery can serve as an auxiliary power source designed primarily to recharge an internal battery within the electronic device and/or to serve as a backup. To disconnect the battery 40 from engagement with the housing 20, the wearer can depress at least one release button 46 to disengage the clip or snap, and thereby allowing the wearer to slide the battery away from the housing. Advantageously, in this manner the battery can be removed and replaced with the device still on the user's arm. In alternate forms of the present invention, the battery 40 can directly snap into place without the use of rails 42 as presented in the following embodiment. It will be understood that the present invention can be embodied in devices having the contoured mounting surface aspect described herein but with the battery mounted in conventional arrangements, and that the present invention is not limited to any particular type, location, or mounting configuration of the battery.

Figure 10:
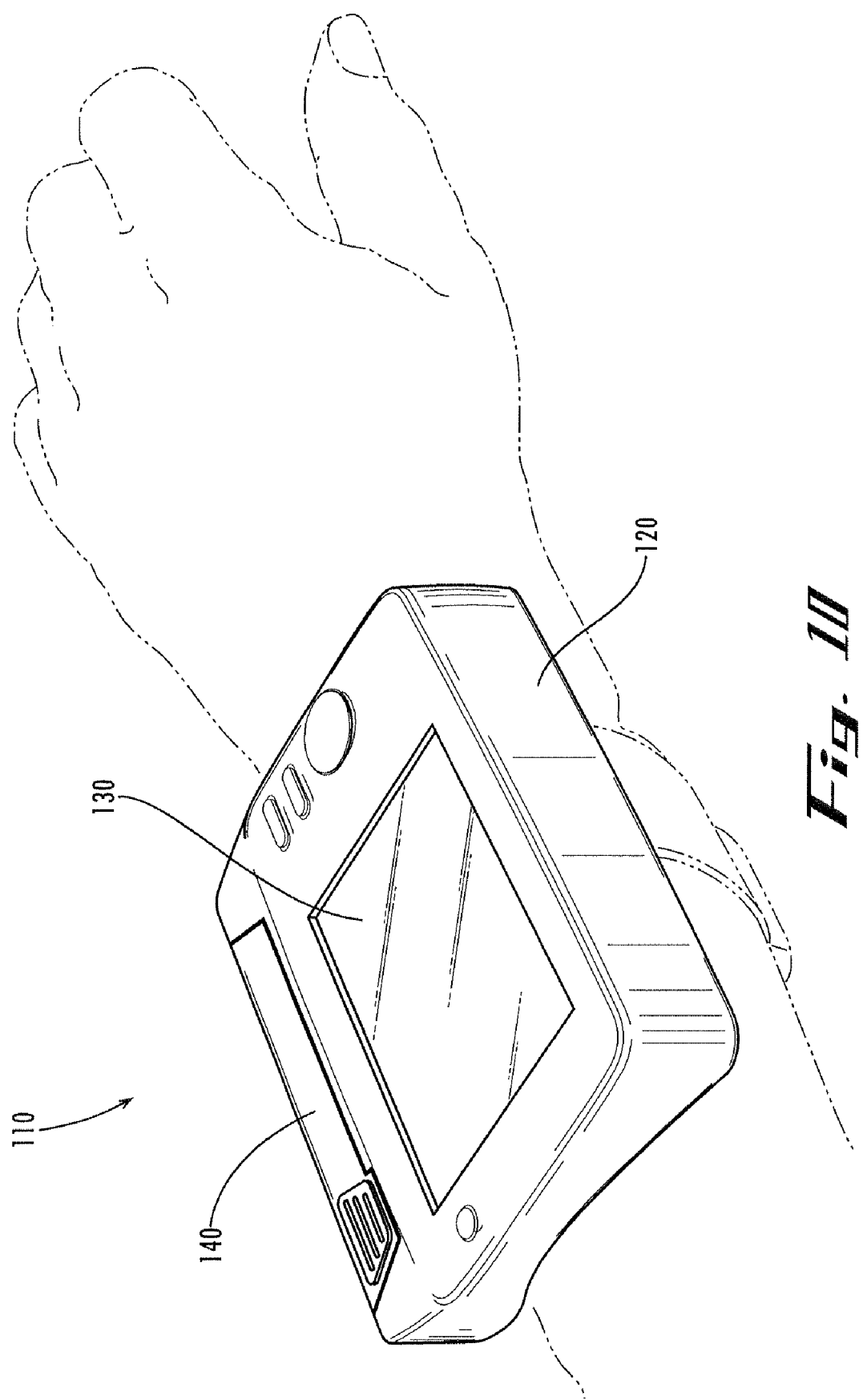
FIG. 10 is a front perspective view of a wearable electronic communication device according to a second example embodiment, showing the device being worn on a user's wrist.
Figure 11:
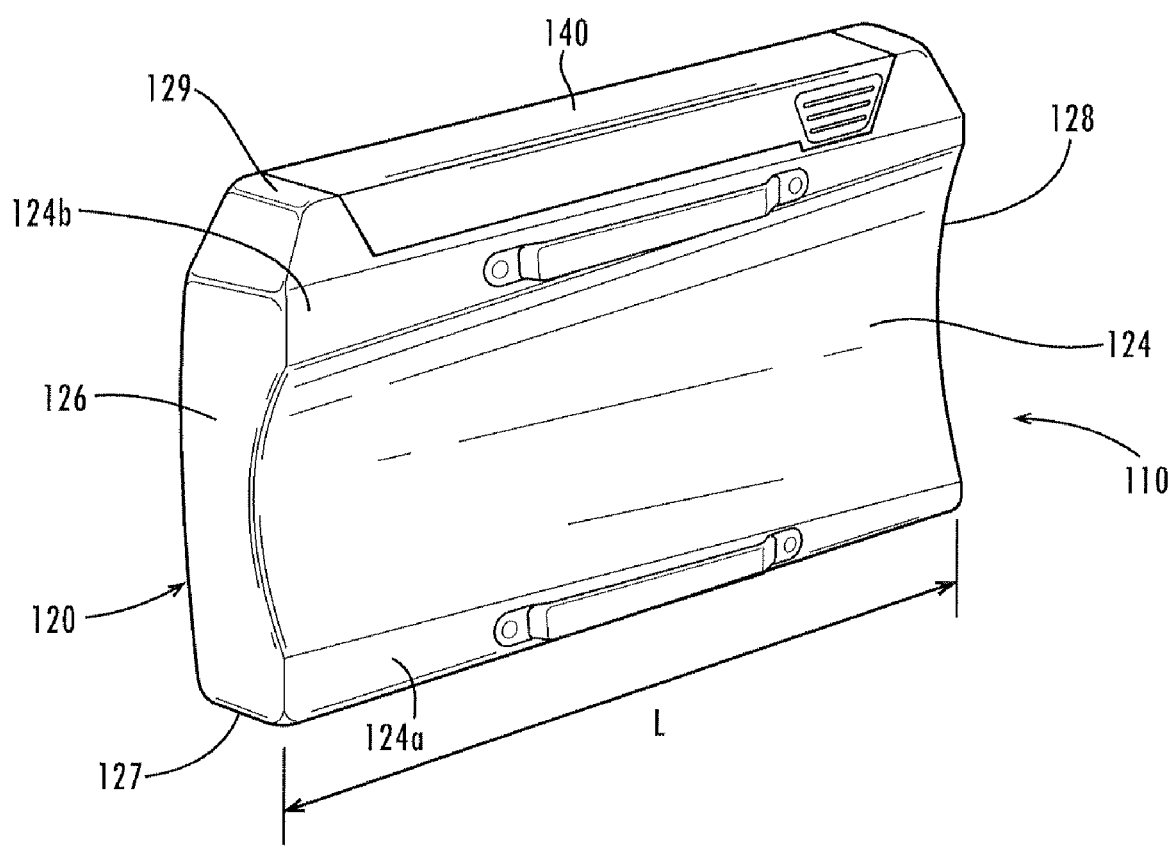
FIG. 11 is a back perspective view of the wearable communication device of FIG. 10, showing the contoured back of the device.

FIGS. 10 and 11 show a wearable electronic communication device 110 according to a second example embodiment of the present invention. The device 110 is similar to that of the first example embodiment, and includes a housing 120, a display screen 130 and a battery 140. In this embodiment, however, the contoured back surface 124 of the housing 120 is frustoconical (that is, a longitudinal cross section of a frustocone), so that the radius of curvature of the back surface decreases along the length L of the housing. Thus, the radius of curvature of the back surface 124 is smaller at the wrist side 126 of the housing 120 than at the elbow side 128. Also, the housing 120 has two flat portions 124a and 124b adjacent the bottom and top surfaces 127 and 129, with the contoured back surface 124 between the flat portions. This tapered curvature more closely matches the tapered aspect of the human forearm (larger at the elbow and smaller at the wrist). This provides a better fit for more comfortably and securely wearing the communication device 110 on the arm of a user so that it is constantly or immediately available for use by the wearer.

The tapered curved back surface 124 fits one way, but not the other, on a user's forearm. For use on either the left or the right arm with the display screen 130 properly oriented, left and right models of the device 110 can be provided.

In addition, in this embodiment the battery 140 snaps into engagement with the housing 120, rather than sliding into engagement as demonstrated in the prior embodiment. In this regard, the housing 120 defines a shallow, wedge-shaped recess along one side or edge and the battery 140 has a shape that corresponds to the shallow wedge-shaped recess. In this way, the battery is nestably received in the edge or side of the housing 120 in a mating fashion.

Figure 12:
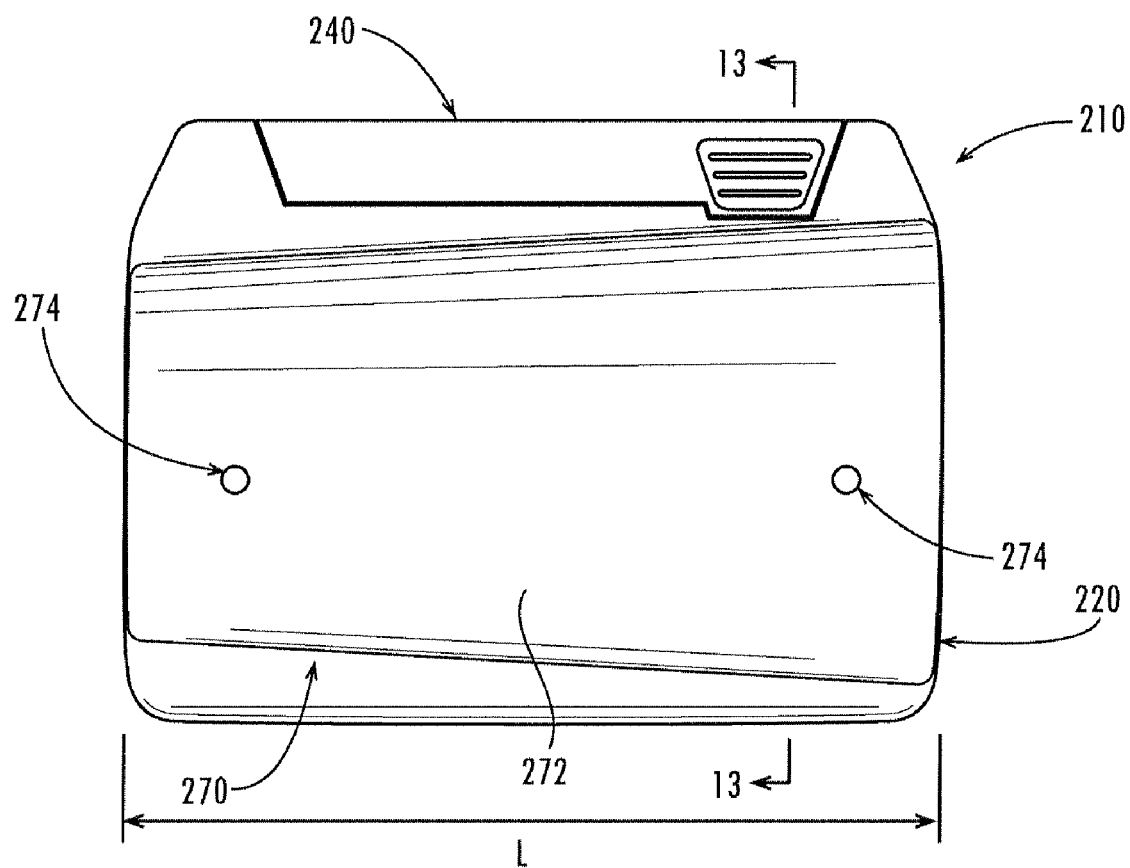
FIG. 12 is a back view of a wearable electronic communication device according to a third example embodiment, showing the housing coupled to a contoured mount.
Figure 13:
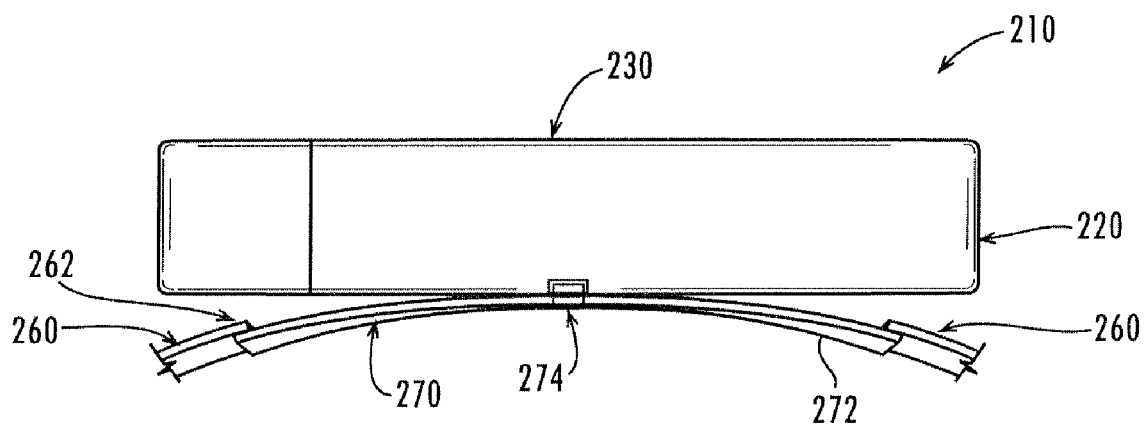
FIG. 13 is a cross-section view of the wearable communication device of FIG. 12 taken at line 13-13.

FIGS. 12 and 13 show a wearable electronic communication device 210 according to a third example embodiment of the present invention. The device 210 includes a housing 220, a display screen 230, a battery 240, and a mount 270. The device 210 has one or more couplings 274 for removably attaching the housing 220 to the mount 270 so that the housing can be detached, repositioned, and re-attached to the mount. The couplings 274 may be of a conventional type such as threaded screws and holes or other fasteners for securely attaching two parts together. Preferably, the strap 260 has ends that terminate at and are attached to the mount 270 at the connectors 262, instead of looping all the way across the mount. The mount 270 has a back surface 272 that is contoured to conform to the wearer's arm. In the depicted embodiment, the back surface 272 of the mount 270 is frustoconical, with a radius of curvature that decreases along the length L of the mount. Thus, the device 210 as shown is in a position for being worn on the left arm. To wear the same device 210 on the right arm, the housing 220 is detached from the mount 270, rotated 180 degrees, and reattached to the mount using the same couplings 274. In this way, one model can be provided for use on the left or right arm, while still obtaining the close and comfortable fit of a curved and tapered back surface.

Figure 14:
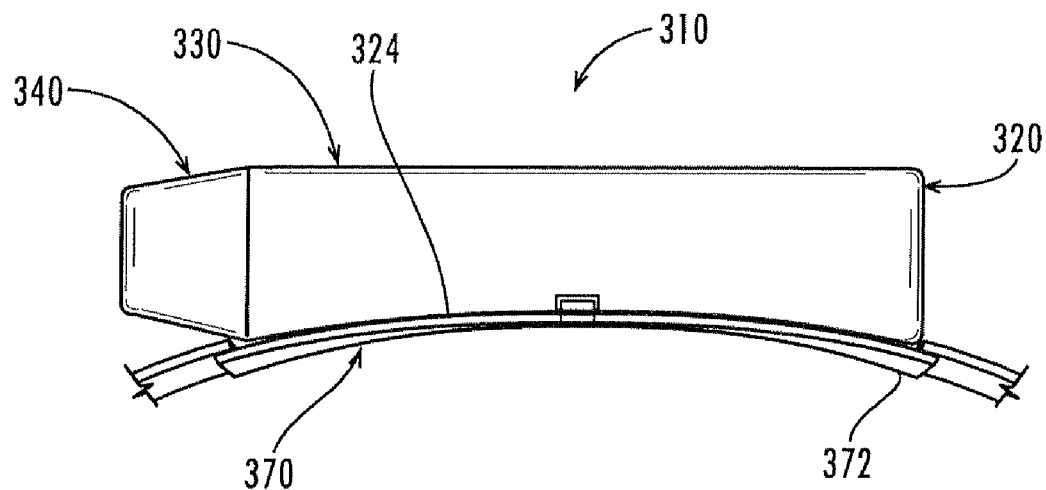
FIG. 14 is a left side view of a wearable electronic communication device according to a fourth example embodiment, showing the housing coupled to a contoured mount.
Figure 15:
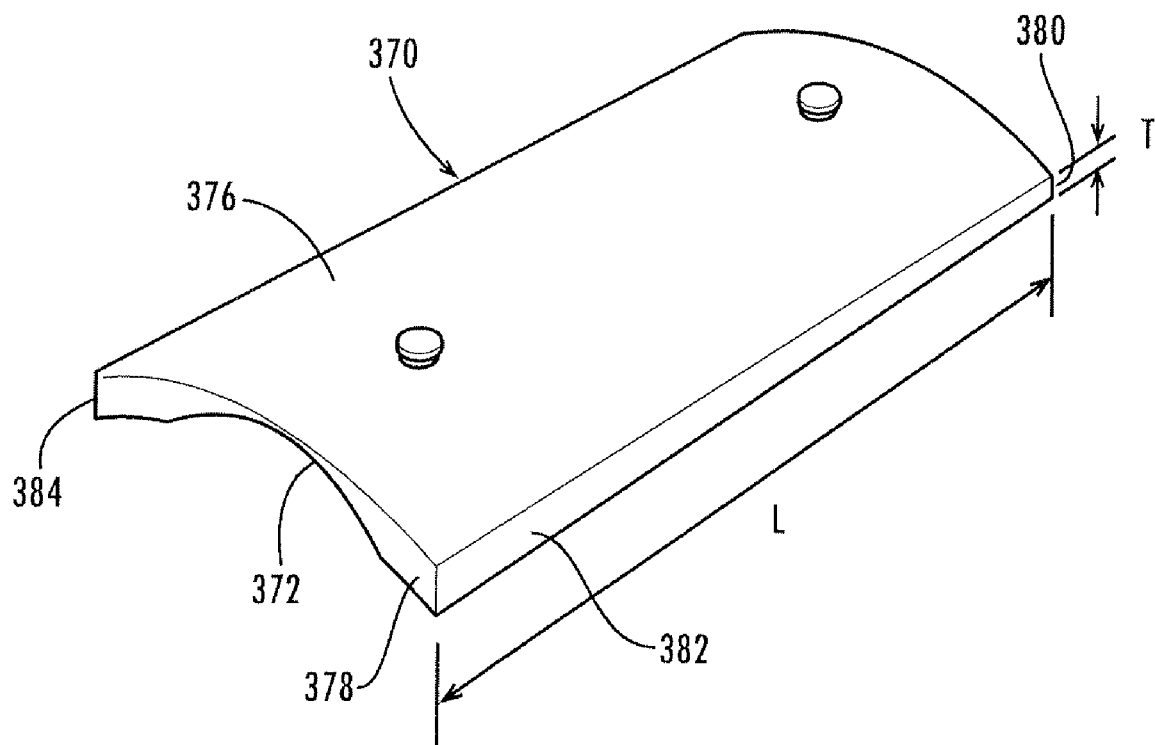
FIG. 15 is a front perspective view of the contoured mount of FIG. 14, showing different-radiused front and back surfaces.

FIGS. 14 and 15 show a wearable electronic communication device 310 according to a fourth example embodiment of the present invention. The device 310 is similar to that of the third example embodiment, and includes a housing 320, a display screen 330, a battery 340, and a mount 370, with the housing being repositionable on the mount in orientations for wearing on the left or right arm. Also similarly, the mount 370 has a back surface 372 that is frustoconically concave. In this embodiment, however, the mount 370 has a front surface 376 that is cylindrically convex and the back surface 324 of the housing is cylindrically concave to receive with a nice fit the mount's cylindrically convex front surface. Thus, the bottom and top edges 382 and 384 of the mount 370 have a larger thickness T at the wrist side 378 than at the elbow side 380. In this way, there is a very secure and stable mounting of the housing 320 on the mount 370, with full and continuous contact therebetween along the entire length L of the mount when the device is positioned for wearing on either the left or the right arm.

Other embodiments are contemplated by and intended to be within the scope of the present invention. In one such alternative embodiment, the housing has a contoured back surface but no straps, as the device is inserted into and worn in a carrier pouch. In another such alternative embodiment, the edge-mounted battery has a contoured back surface that continues the curvature of the back surface of the housing.

Whereas this invention has been described in detail with particular reference to example embodiments and variations thereof, it will be understood that other variations and modifications can be made within the scope and spirit of the invention, as described herein before and as defined in the appended claims.

What is claimed is:

1. A portable electronic communication device for wearing on a forearm of a user, comprising:

a housing having a front;

a display screen at the front of the housing; and a mounting surface that is contoured to generally conform to the user's forearm, wherein the device can be comfortably and securely worn on the user's forearm so that the display screen is constantly or immediately accessible and viewable by the user, wherein the housing has a back that defines the contoured mounting surface, and wherein the contoured mounting surface of the housing back has a frustoconically concave shape.

2. The communication device of claim 1, wherein the housing back has two flat portions and the contoured mounting surface is therebetween.

3. A portable electronic PDA-like communication device for wearing on a forearm of a user, the communication device comprising:
- a housing having a front and a back, the housing back having a length that is about 3 to 7 inches long and having a contour with a frustoconically concave shape along the entire length to generally conform to the user's forearm; and
- a display screen at the front of the housing,
- wherein the device can be comfortably and securely worn on the user's forearm so that the display screen is constantly or immediately accessible and viewable by the user.

4. The communication device of claim 3, wherein the housing is at least about 4½ inches long and at least about 2 inches across.

5. The communication device of claim 3, wherein the housing has sides between the housing front and the housing back, and further comprising a battery removably positioned along one of the sides, wherein the battery can be removed and replaced without removing the communication device from the user's forearm.

* * * * *